United States Patent
Dargatz et al.

(10) Patent No.: US 8,179,147 B2
(45) Date of Patent: May 15, 2012

(54) METHOD AND APPARATUS FOR DETECTION AND CONTROL OF DC ARC FAULTS

(75) Inventors: Marv Dargatz, Auburn, CA (US); Martin Fornage, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 98 days.

(21) Appl. No.: 12/804,541

(22) Filed: Jul. 23, 2010

(65) Prior Publication Data

US 2011/0019444 A1 Jan. 27, 2011

Related U.S. Application Data

(60) Provisional application No. 61/227,949, filed on Jul. 23, 2009.

(51) Int. Cl.
*H01H 9/50* (2006.01)
*H02H 3/00* (2006.01)
(52) U.S. Cl. .......................................... 324/536; 361/42
(58) Field of Classification Search ................... 324/536; 361/42
See application file for complete search history.

(56) References Cited

U.S. PATENT DOCUMENTS

| 6,833,713 | B2 | 12/2004 | Schoepf et al. |
| 7,009,406 | B2 | 3/2006 | Naidu et al. |
| 7,338,311 | B2 | 3/2008 | Laschinksi et al. |
| 7,489,138 | B2 * | 2/2009 | Yu et al. ......................... 324/536 |
| 7,812,592 | B2 * | 10/2010 | Prior et al. .................. 324/76.39 |
| 2007/0133135 | A1 | 6/2007 | Kilroy et al. |
| 2007/0183103 | A1 * | 8/2007 | Sung .............................. 361/42 |
| 2008/0094867 | A1 | 4/2008 | Muller et al. |
| 2008/0097655 | A1 | 4/2008 | Hadar et al. |
| 2008/0238195 | A1 | 10/2008 | Shaver et al. |
| 2009/0079436 | A1 | 3/2009 | Kojori et al. |
| 2009/0097172 | A1 | 4/2009 | Bremicker et al. |
| 2009/0114263 | A1 | 5/2009 | Powell et al. |
| 2009/0146505 | A1 | 6/2009 | Powell et al. |
| 2010/0045259 | A1 | 2/2010 | Muller |

FOREIGN PATENT DOCUMENTS

| EP | 1657797 A1 | 5/2006 |
| WO | WO 2008/108770 A1 | 9/2008 |

OTHER PUBLICATIONS

International Search Report and Written Opinion mailed Feb. 23, 2011 for PCT Application No. PCT/US2010/043096.

* cited by examiner

*Primary Examiner* — Amy He
(74) *Attorney, Agent, or Firm* — Moser Taboada

(57) ABSTRACT

A method and apparatus for managing DC arc faults. At least a portion of the method is performed by a controller comprising at least one processor. In one embodiment, the method comprises analyzing a signature of a signal of a power converter and determining, based on analysis of the signature, whether an arc fault exists.

17 Claims, 4 Drawing Sheets

METHOD AND APPARATUS FOR DETECTION AND CONTROL OF DC ARC FAULTS

CROSS-REFERENCE TO RELATED APPLICATIONS

This application claims benefit of U.S. provisional patent application Ser. No. 61/227,949, filed Jul. 23, 2009, which is herein incorporated in its entirety by reference.

BACKGROUND OF THE INVENTION

1. Field of the Invention

Embodiments of the present disclosure generally relate to renewable energy power systems and, more particularly, to a method and apparatus for detecting series and parallel DC arc faults in a DC circuit of a photovoltaic (PV) system.

2. Description of the Related Art

Solar modules have historically been deployed in mostly remote applications, such as remote cabins in the wilderness or satellites, where commercial power was not available. Due to the high cost of installation, solar modules were not an economical choice for generating power unless no other power options were available. However, the worldwide growth of energy demand is leading to a durable increase in energy cost. In addition, it is now well established that the fossil energy reserves currently being used to generate electricity are rapidly being depleted. These growing impediments to conventional commercial power generation make solar modules a more attractive option to pursue.

Solar modules, or photovoltaic (PV) modules, convert energy from sunlight received into direct current (DC). The PV modules cannot store the electrical energy they produce, so the energy must either be dispersed to an energy storage system, such as a battery or pumped hydroelectricity storage, or dispersed by a load. One option to use the energy produced is to employ inverters to convert the DC current into an alternating current (AC) and couple the AC current to the commercial power grid. The power produced by such a distributed generation (DG) system can then be sold to the commercial power company, or used to offset local consumption of electricity by local loads.

In order to mitigate potential safety hazards during such DC to AC power conversion, a DC circuit of the PV system must often be protected with fuses, and specific system design constraints must be followed. In addition, a Ground Fault Detection and Interruption circuit is often required. Such protective measures may also be utilized in DC/DC power converters. These protective measures, however, do not provide reliable detection or mitigation of DC arc faults during power conversion (i.e., DC/DC or DC/AC power conversion). Such arcs are extremely dangerous, as the DC PV system will continue to provide energy into a short circuit or an arcing circuit as long as the PV modules continue to be irradiated with light, potentially leading to a fire.

Therefore, there is a need for a method and apparatus for automatically detecting series and parallel DC arc faults and extinguishing those arcs.

SUMMARY OF THE INVENTION

Embodiments of the present invention generally relate to a method and apparatus for managing DC arc faults. At least a portion of the method is performed by a controller comprising at least one processor. In one embodiment, the method comprises analyzing a signature of a signal of a power converter and determining, based on analysis of the signature, whether an arc fault exists.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
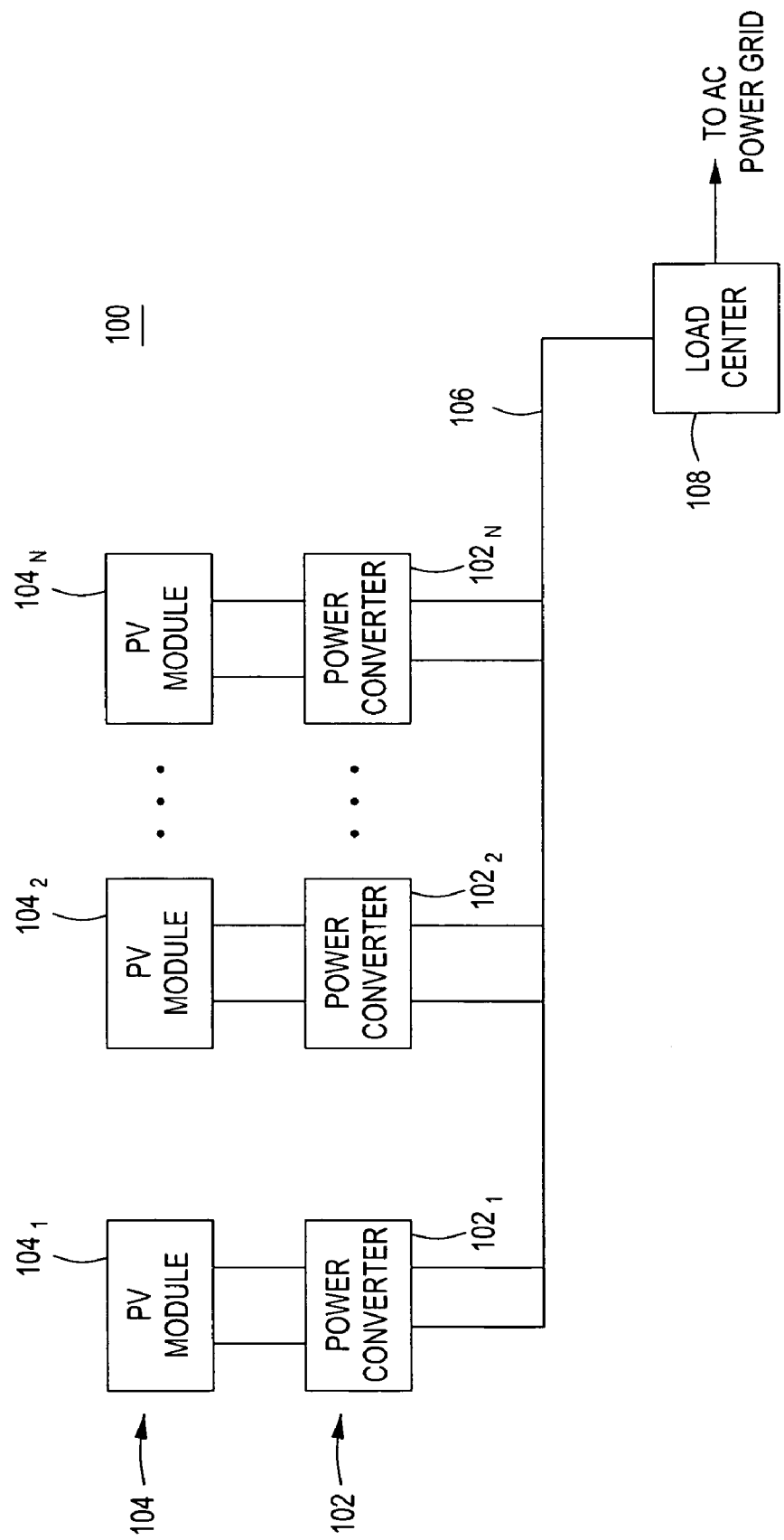
FIG. 1 is a block diagram of a system for inverting solar generated DC power to AC power in accordance with one or more embodiments of the present invention.

FIG. 1 is a block diagram of a system 100 for inverting solar generated DC power to AC power in accordance with one or more embodiments of the present invention. This diagram only portrays one variation of the myriad of possible system configurations. The present invention can function in a variety of environments and systems.

The system 100 comprises a plurality of power converters $102_1$, $102_2$ ... $102_n$, collectively referred to as power converters 102, a plurality of PV modules $104_1$, $104_2$ ... $104_n$, collectively referred to as PV modules 104, an AC bus 106, and a load center 108. Two input terminals of each power converter $102_1$, $102_2$ ... $102_n$ are coupled to two output terminals of a corresponding PV module $104_1$, $104_2$ ... $104_n$; i.e., the power converters 102 and the PV modules 104 are coupled in a one-to-one correspondence.

The power converters 102 each comprise a DC/DC conversion module coupled to a DC/AC inversion module, as described below with respect to FIG. 2, for inverting the DC power generated by the PV modules 104 to AC power (i.e., AC current); alternatively, a single stage converter may convert DC directly to AC. The power converters 102 are coupled to the AC bus 106, which in turn is coupled to the load center 108. In some embodiments, the load center 108 houses connections between incoming power lines from a commercial AC power grid distribution system ("grid") and the AC bus 106. Additionally or alternatively, the AC bus 106 may be regulated by a battery-based (or other energy storage source) inverter and/or a rotating machine generator. The power converters 102 meter out AC current that is in-phase with the AC power grid voltage, and the system 100 couples the generated AC power to the power grid via the load center 108. Additionally or alternatively, the generated AC power may be supplied directly to commercial and/or residential systems via the load center 108, and/or stored for later use (e.g., utilizing batteries, heated water, hydro pumping, $H_2O$-to-hydrogen conversion, or the like).

In some alternative embodiments, the power converter 102 may not comprise a DC/DC converter (i.e., the power converter 102 comprises a single-stage DC/AC inverter) and a separate DC/DC converter may be coupled between each PV module 104 and each power converter 102 (i.e., one DC/DC converter per power converter/PV module pair). In other alternative embodiments, each of the power converters 102 may be a DC/DC converter to convert the DC power generated by the PV modules 104 into DC at a different voltage. In such other alternative embodiments, the converted DC power from the power converters 102 may be supplied to commercial and/or residential DC systems, and/or the produced energy may be stored, for example, in storage batteries.

In still other alternative embodiments, multiple PV modules 104, coupled in series and/or parallel configurations, may be coupled to a single power converter 102. For example, the PV modules 104 of the system 100 may be coupled to a single centralized power converter 102 that inverts the DC power from the PV modules 104 to AC power (i.e., a centralized inverter). In some such alternative embodiments, a DC/DC converter may be coupled between the PV modules 104 and the centralized power converter 102; alternatively, the centralized power converter 102 may be a DC/DC converter that converts the DC power generated by the PV modules 104 into DC at a different voltage. Any of the aforementioned configurations for converting DC to AC may, in some embodiments, be comprised of a single DC/AC converter (i.e., a single stage DC/AC converter).

In order to control the power conversion performed, the power converters 102 may measure (for example, at intervals ranging from microseconds to tens of milliseconds) one or more of DC current and voltage from the PV modules 104 as well as AC current and voltage generated by the power converters 102. In accordance with one or more embodiments of the present invention, the power converters 102 may utilize at least a portion of the measured data to determine whether a DC arc fault is present and to control such an arc fault, as further described below. In some embodiments, one or more signatures based on one or more signals of a power converter 102 (e.g., DC current, DC voltage, AC current, AC voltage, DC power, AC power, a derivative of any of such signals, a combination of any of such signals, or the like) may be analyzed to determine whether a DC arc fault exists. The DC arc fault may consist of a parallel arc across the power converter input terminals or across output terminals of the DC/DC conversion module of the power converter 102. Alternatively, the DC arc fault may consist of a series arc, for example, between one of the PV module output terminals and the coupled power conversion module input terminal, or between an output terminal of the power converter DC/DC conversion module and the coupled DC/AC inversion module terminal.

Figure 2:
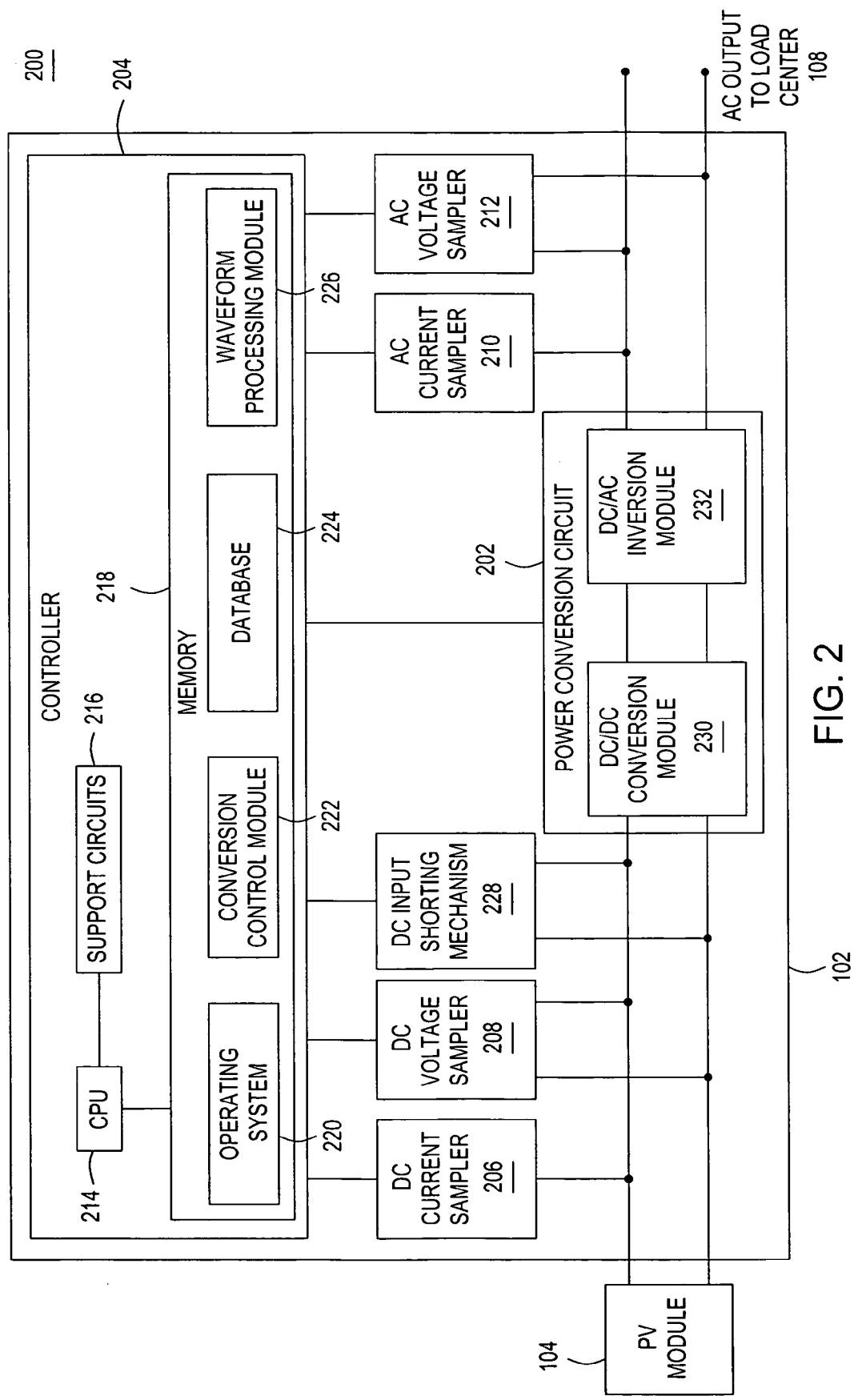
FIG. 2 is a block diagram of a power converter in accordance with one or more embodiments of the present invention.

FIG. 2 is a block diagram of a power converter 102 in accordance with one or more embodiments of the present invention. The power converter 102 comprises a power conversion circuit 202, a controller 204, a DC current sampler 206, a DC voltage sampler 208, an AC current sampler 210, an AC voltage sampler 212, and a DC input shorting mechanism 228.

The power conversion circuit 202 comprises a DC/DC conversion module 230 and a DC/AC inversion module 232. The DC/DC conversion module 230 is coupled via two input terminals to the PV module 104 and via two output terminals to two input terminals of the DC/AC inversion module 232, which is further coupled via two output terminals to the load center 108. The DC/DC conversion module 230 and the DC/AC inversion module 232 are each coupled to the controller 204. The DC/DC conversion module 230 and the DC/AC inversion module 232 act to convert the DC power from the PV modules 104 to a second DC power and then to an AC power, respectively, based on control signals from the controller 204. As such, the power conversion circuit 202 converts DC current received from the PV module 104 to AC current with the controller 204 providing operative control and driving the power conversion circuit 202 to inject the generated AC output current in phase with the grid, as required by the relevant standards.

The DC current sampler 206 is coupled to an input terminal of the power conversion circuit 202, and the DC voltage sampler 208 is coupled across the two input terminals of the power conversion circuit 202. The AC current sampler 210 is coupled to an output terminal of the power conversion circuit 202, and the AC voltage sampler 212 is coupled across the two output terminals of the power conversion circuit 202. The DC current sampler 206, the DC voltage sampler 208, the AC current sampler 210, and the AC voltage sampler 212 are each coupled to the controller 204. Additionally, the DC input shorting mechanism 228 is coupled across the two power conversion circuit input terminals and to the controller 204.

The controller 204 comprises at least one central processing unit (CPU) 214, which is coupled to support circuits 216 and to a memory 218. The CPU 214 may comprise one or more conventionally available microprocessors or digital signal processors (DSPs); additionally or alternatively, the CPU 214 may include one or more application specific integrated circuits (ASIC). The support circuits 216 are well known circuits used to promote functionality of the CPU 214. Such circuits include, but are not limited to, a cache, power supplies, clock circuits, buses, network cards, input/output (I/O) circuits, and the like. The controller 204 may be implemented using a general purpose processor that, when executing particular software, becomes a specific purpose processor for performing various embodiments of the present invention.

The memory 218 may comprise random access memory, read only memory, removable disk memory, flash memory, and various combinations of these types of memory. The memory 218 is sometimes referred to as main memory and may, in part, be used as cache memory or buffer memory. The memory 218 generally stores the operating system (OS) 220 of the controller 204. The OS 220 may be one of a number of commercially available operating systems such as, but not limited to, Linux, Real-Time Operating System (RTOS), and the like.

The memory 218 may store various forms of application software, such as a conversion control module 222 for controlling the operation of the power conversion circuit 202. The conversion control module 222 may receive the sampled DC and AC current and voltage values and utilize such data to provide the control and switching signals for the power conversion circuit 202. Additionally, the memory 218 may comprise a database 224 for storing data, and a waveform processing module 226 for determining and managing DC arc faults (e.g., determining an arc type of series or parallel, determining voltage and current characteristics, and the like), as described in detail below. The database 224 may store data related to the power conversion and/or data related to processing performed by the waveform processing module 226; for example, sampled DC and AC voltage and current values, computed current and/or voltage slope, computed changes in current and/or voltage slope over time, one or more thresholds for use in determining a DC arc fault event, DC arc fault event intervals, voltage and current correlations, and the like. In some embodiments, the conversion control module 222, database 224, and/or waveform processing module 226, or portions thereof, may be implemented in software, firmware, hardware, or a combination thereof.

As part of controlling power production by the power conversion circuit 202, the DC current sampler 206 and the DC voltage sampler 208 sample the DC current and voltage, respectively, generated by the PV module 104 and provide such sampled DC current and voltage values to the controller 204. Additionally, the AC current sampler 210 and the AC voltage sampler 212 sample the AC current and voltage, respectively, at the output of the power conversion circuit 202 and provide such sampled AC current and voltage values to the controller 204. The input signals to each of the samplers are filtered, for example via traditional analog filter techniques, digital signal processing, or similar techniques, and an analog-to-digital (A/D) conversion is performed utilizing standard A/D technology. The resulting instantaneous values, or samples, of DC current, DC voltage, AC current, and AC voltage may be stored digitally in the database 224 for use by the waveform processing module 226 in determining whether a DC arc faults exists, as described below.

In accordance with one or more embodiments of the present invention, the waveform processing module 226 utilizes the sampled DC current and voltage values, which respectively define DC current and voltage signatures that characterize the DC circuit current and voltage over time, to determine an occurrence of a DC arc fault. The characteristics of an arc fault may be extracted from the sampled current and voltage values by filtering unwanted artifacts from the sampled data and quantizing the dynamic behavior of the voltage and current values, as well as their relationship to each other. In some embodiments, the waveform processing module 226 analyzes, for example, generally every millisecond (msec) but as often as every microsecond (μsec), the DC current and voltage signatures defined by at least a portion of the DC current and voltage samples in order to identify an arc fault; for such analysis, sampled current and/or voltage values may be averaged over a period of, for example, approximately 1 msec for analysis. In other embodiments, the signatures may be updated analyzed more or less frequently. In some embodiments, the waveform processing module 226 may analyze at least several tens of microseconds to a few milliseconds of data to identify characteristics indicating a DC arc fault (i.e., a series arc or a parallel arc).

In one or more alternative embodiments, DC voltage and AC current signatures defined by sampled DC voltage and sampled AC current, respectively, may be utilized to determine the presence of a DC arc fault (both current and voltage signatures are utilized to determine the existence of an arc fault).

In order to identify a DC arc fault, the waveform processing module 226 analyzes the DC current signature for a change in polarity or a rapid change in slope (e.g., on the order of 0.1 amp/microsecond in some embodiments) indicating a potential DC arc fault. During normal operating conditions (i.e., no arc faults), the DC current polarity should always be positive and change in slope of DC current is normally due to changes in the commanded output current of the power converter 102; any fast change in current polarity or a change in slope that is not due to a change in commanded output current is suspect as being due to an arc fault. Slower changes may be due to changes in irradiance, and will not be detected as an arc fault. If a potential DC arc fault is identified, the waveform processing module 226 compares the DC current signature to the DC voltage signature, e.g., the DC current and voltages are analyzed for coincidence and polarity that are not the result of changes in commanded output current of the power converter 102. If, based on such comparison, it is determined that a DC arc fault signature match exists (i.e., one or more characteristics of the DC current and/or DC voltage signature are indicative of a DC arc fault), the DC current polarity is utilized to differentiate whether the DC circuit is experiencing a series or parallel arc event. In some embodiments, a DC arc fault signature match may be determined based on current and/or voltage changes, such as a maximum change in current and/or voltage over time.

If the DC current polarity has remained positive, a series arc has occurred and the waveform processing module 226 causes the power converter 102 to cease power production. If the DC current polarity has a negative occurrence, a parallel arc has potentially occurred. During normal operation, i.e., when no arc faults exist, the DC current polarity should always be positive. However, when a parallel arc occurs, a large amount of negative current occurs for a time on the order of a millisecond (e.g., due to a violent discharge of one or more capacitors located across the DC input of the power converter; such a discharge does not occur in the event of a series arc). As a result of determining that the DC current polarity is negative, the waveform processing module 226 drives the controller 204 to inhibit power production by the power converter 102 and to lock the DC input shorting mechanism 228, which provides a short circuit across the input to the power conversion circuit 202. In order to verify that a parallel arc has, in fact, occurred, the waveform processing module 226 analyzes the DC current signature for DC current fluctuations, for example, as determined by comparison to a threshold (e.g., changes in current that are much more rapid than under normal operating conditions). Specific di/dt will depend on the length of the DC wire run, the normal DC voltage, and the power rating of the DC source as it interacts with the input characteristics of the power converter 102; di/dt in excess of the normal control mechanism (e.g., as compared to a threshold) may be indicative of an arc fault. If the DC current is not fluctuating, a parallel arc is confirmed and the DC input shorting mechanism 228 remains locked. If the DC current is fluctuating, the arc is a series arc and the waveform processing module 226 drives the controller 204 to unlock the DC input shorting mechanism 228 (i.e., to open the DC terminals) while continuing to lock out the power production.

In some embodiments, the power converter 102 may employ an auto-restart technique for attempting to restart the power converter 102 and resume power production after some period of time, for example on the order of a few minutes subsequent to the arc detection and termination of power production. The power converter 102 may attempt such a restart one or more times before sustaining the termination of power production in the event that the arc fault remains or recurs.

In one or more alternative embodiments, occurrence of a DC arc fault may be determined based on a power signature generated from the sampled DC current and voltage data, or from the sampled AC current and DC voltage data.

Figure 3:
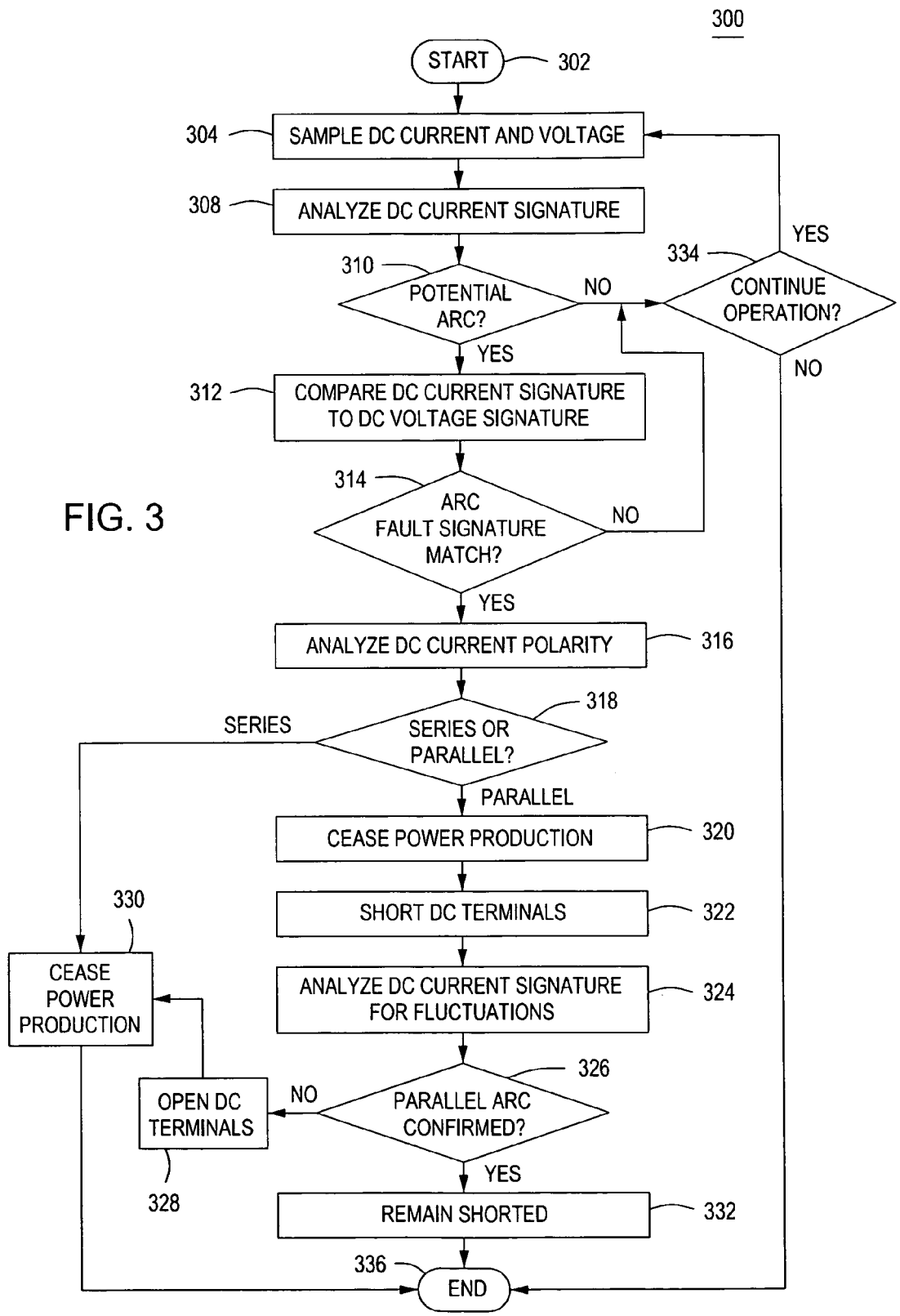
FIG. 3 is a flow diagram of a method for identifying and managing a DC arc fault in a power conversion system in accordance with one or more embodiments of the present invention.

FIG. 3 is a flow diagram of a method 300 for identifying and managing a DC arc fault in a power conversion system in accordance with one or more embodiments of the present invention. In some embodiments, such as the embodiment described below, the power conversion system comprises one or more power converters, such as DC/AC inverters, coupled to one or more PV modules. In such embodiments, the DC/AC inverters may each comprise a DC/DC conversion module followed by a DC/AC inversion module to invert the DC power generated by the PV modules to AC power (e.g., the power converters 102 comprising the DC/DC conversion modules 230 and the DC/AC inversion modules 232); alternatively, the DC/AC inverters may utilize a single DC/AC conversion stage. The generated AC power may then be coupled to an AC power grid, provided directly to commercial and/or residential AC powered devices, and/or stored for later use (e.g., utilizing batteries, heated water, hydro pumping, $H_2O$-to-hydrogen conversion, or the like). In one or more alternative embodiments, the power converters may be DC/DC converters for converting the DC power generated by the PV modules into DC at a different voltage.

In some embodiments, a signature based on one or more signals of a power converter (e.g., DC current, DC voltage, AC current, AC voltage, DC power, AC power, a derivative of any of such signals, a combination of any of such signals, or the like) may be analyzed to determine whether a DC arc fault exists.

The method 300 begins at step 302 and proceeds to step 304, where DC current and DC voltage from the PV module(s) coupled to a power converter in the power conversion system are sampled. The measured DC current and DC voltage may be filtered, for example by traditional analog filter techniques, digital signal processing, or similar techniques, and an A/D conversion may be performed utilizing standard A/D technology. The resulting instantaneous DC current value and instantaneous DC voltage value (i.e., the DC current and voltage samples) may be stored, for example, within a memory of the power converter, such as memory 218. In one or more embodiments, AC current and/or AC voltage generated by the power converter may be analogously sampled and stored for use in identifying and managing DC arc faults, such as a DC arc fault at the input or the output of the power converter's DC/DC conversion module.

At step 308, a DC current signature is analyzed to determine whether a potential arc has occurred. The DC current signature is defined by the sampled DC current and characterizes the DC current over time. In some embodiments, the DC current signature is analyzed for a rapid change in slope (e.g., on the order of 0.1 amp/microsecond in some embodiments) or a change in polarity to indicate a potential arc, as previously described.

The method 300 proceeds to step 310, where a determination is made whether a potential arc has been identified based on the analysis of step 308. If the result of such determination is no, the method 300 proceeds to step 334. At step 334, a determination is made whether to continue operation. If, at step 334, the result of the determination is yes, the method 300 returns to step 304; if the result of the determination is no, the method 300 proceeds to step 336 where it ends. The determination in step 334 may be based upon the repetitive occurrence of the indication of an arc fault which may indicate an intermittent fault, or may indicate a failure in the measurement and control system.

If, at step 310, the result of the determination is yes (i.e., a potential arc has been identified), the method 300 proceeds to step 312. At step 312, the DC current signature is compared to a DC voltage signature. The DC voltage signature is defined by the sampled DC voltage and characterizes the DC voltage over time. The DC current and voltage signatures are compared to identify characteristics consistent with a DC arc fault signature (i.e., to determine whether a DC arc fault signature match exists). In some embodiments, the DC current and voltage signatures are analyzed for coincidence and polarity that are not the result of changes in commanded output current of the power converter. At step 314, a determination is made whether a DC arc fault signature match exists based on the comparison of step 312. If the result of such determination is no, the method 300 proceeds to step 334; if the result of such determination is yes, the method 300 proceeds to step 316.

At step 316, the DC current polarity is utilized to differentiate whether the DC circuit is experiencing a series or parallel arc event. If the DC current polarity has remained positive, it is determined that a series arc has occurred; if the DC current polarity has a negative occurrence, it is determined that a parallel arc has potentially occurred. At step 318, a determination is made whether a series or a parallel arc is identified based on the analysis of step 316. If the result of such determination is that a series arc has occurred, the method 300 proceeds to step 330. At step 330, power production by the power converter is inhibited; the method 300 then proceeds to step 336 where it ends.

If, at step 318, the result of the determination is that a parallel arc has potentially occurred, the method 300 proceeds to step 320. At step 320, power production by the power converter is inhibited. At step 322, DC terminals at the input of the power converter are shorted, for example by locking a DC input shorting mechanism (e.g., DC input shorting mechanism 228). At step 324, the DC current signature is analyzed for DC current fluctuations, for example as determined by comparison to a threshold (e.g., changes in current that are much more rapid than under normal operating conditions); if the DC current is not fluctuating, a parallel arc is confirmed. At step 326, a determination is made whether the parallel arc is confirmed based on the analysis of step 324. If the result of such determination is no, the arc is determined to be a series arc and the method 300 proceeds to step 328, where the shorted DC terminals are opened, for example by unlocking the DC input shorting mechanism. The method 300 then proceeds to step 330 and the power production by the power converter remains locked out. If, at step 326, the result of such determination is yes (i.e., a parallel arc is confirmed), the method 300 proceeds to step 332, where the DC input terminals remain shorted. The method 300 then proceeds to step 336 where it ends.

In one or more alternative embodiments, the method 300 may additionally or alternatively utilize the sampled AC current data and/or the sampled AC voltage data for determining and managing an occurrence of a DC arc fault. In some embodiments, the method 300 may comprise steps for an auto-restart technique for attempting to restart the power converter and resume power production after some period of time, for example on the order of a few minutes subsequent to the arc detection and termination of power production. Such a restart may be attempted one or more times before sustaining the termination of power production in the event that the arc fault remains or recurs.

Figure 4:
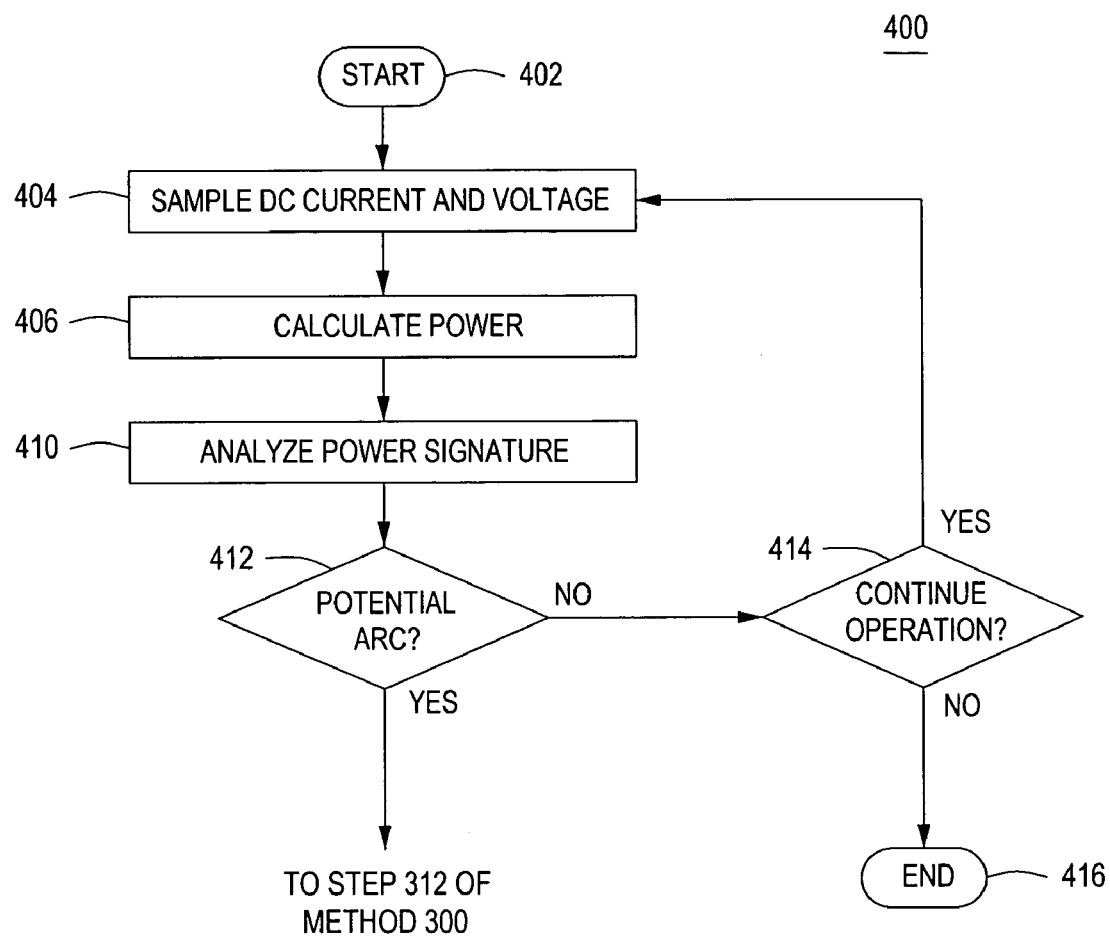
FIG. 4 is a flow diagram of a method for identifying a DC arc fault based on power changes in a power conversion system in accordance with one or more embodiments of the present invention.

FIG. 4 is a flow diagram of a method 400 for identifying a potential DC arc fault based on power changes in a power conversion system in accordance with one or more embodiments of the present invention. In some embodiments, such as the embodiment described below, the power conversion system comprises one or more power converters, such as DC/AC inverters, coupled to one or more PV modules. In such embodiments, the DC/AC inverters may each comprise a DC/DC conversion module followed by a DC/AC inversion module to invert the DC power generated by the PV modules to AC power (e.g., the power converters 102 comprising the DC/DC conversion modules 230 and the DC/AC inversion modules 232). The generated AC power may then be coupled to an AC power grid, provided directly to commercial and/or residential AC powered devices, and/or stored for later use (e.g., utilizing batteries, heated water, hydro pumping, $H_2O$-to-hydrogen conversion, or the like). In one or more alternative embodiments, the power converters may be DC/DC converters for converting the DC power generated by the PV modules into DC at a different voltage.

The method 400 begins at step 402 and proceeds to step 404, where DC current and DC voltage from the PV module(s) coupled to a power converter in the power conversion system are sampled. The measured DC current and DC voltage may be filtered, for example by traditional analog filter techniques, digital signal processing, or similar techniques, and an A/D conversion may be performed utilizing standard A/D technology. At step 406, the resulting instantaneous DC current and voltage values are used to compute an instantaneous DC power. The instantaneous DC power value, as well as the instantaneous DC current and voltage values, may be stored, for example within a memory of the power converter, such as memory 218. In one or more alternative embodiments, AC current and AC voltage from the power converter may be analogously sampled and utilized to obtain AC power measurements for identifying DC arc faults, such as a DC arc fault at the input or the output of the power converter's DC/DC conversion module.

At step 410, a DC power signature is analyzed to determine whether a potential arc has occurred. The DC power signature is defined by the instantaneous DC power values and characterizes the DC power over time. In some embodiments, a rapid power decrease in the DC power signature, for example as determined by comparison to a threshold (e.g., a microsecond change in power more than, for example, a few percent of the rated power that does not coincide with a change in current command from the power converter power control system) indicates a potential arc; additionally or alternatively, the power change dp/dt may be evaluated for determining whether a potential arc has occurred.

The method 400 proceeds to step 412, where a determination is made whether a potential DC arc fault has been identified based on the analysis of step 410. If the result of such determination is no (i.e., no potential DC arc fault), the method 400 proceeds to step 414, where a determination is made whether to continue operation. If the result of such determination at step 414 is yes (i.e., continue operation), the method 400 returns to step 404. If the result of such determination is no, the method 400 proceeds to step 416 where it ends.

If, at step 412, the result of the determination is yes (i.e., a potential DC arc fault), the method 400 proceeds to step 312 of the method 300.

While the foregoing is directed to embodiments of the present invention, other and further embodiments of the invention may be devised without departing from the basic scope thereof, and the scope thereof is determined by the claims that follow.

The invention claimed is:

1. A method for managing arc faults, at least a portion of the method being performed by a controller comprising at least one processor, the method comprising:
analyzing a signature of a signal of a power converter; and
determining, based on analysis of the signature, whether an arc fault exists, wherein analyzing the signature comprises (i) analyzing the signature to identify a potential arc fault, wherein the signature is based on a current of the power converter; and (ii) comparing, upon identifying the potential arc fault, the signature with a second signature for determining an arc fault signature match that identifies the arc fault, wherein the second signature is based on a voltage of the power converter; and
determining polarity of a DC current of the power converter; and
differentiating between a series arc and a parallel arc based on the polarity.

2. The method of claim 1, further comprising inhibiting power production by the power converter upon determining that the arc fault exists.

3. The method of claim 1, further comprising applying a short circuit across DC input terminals of the power converter upon identifying the parallel arc.

4. The method of claim 3, further comprising analyzing the signature for current fluctuations, wherein a non-fluctuating current confirms the parallel arc.

5. The method of claim 4, further comprising removing the short circuit upon determining a fluctuating current.

6. The method of claim 1, wherein the series arc is identified when the polarity is positive and the parallel arc is identified when the polarity is negative.

7. The method of claim 1, wherein the signature is a DC current signature based on a DC current of the power converter and the second signature is a DC voltage signature based on a DC voltage of the power converter.

8. The method of claim 1, wherein determining whether the arc fault exists comprises distinguishing between irradiance-generated changes in the signature and arc-generated changes in the signature.

9. An apparatus for managing arc faults, comprising:
a waveform processing module, adapted for coupling to a power conversion circuit, for analyzing a signature of a signal of the power conversion circuit and determining, based on analysis of the signature, whether an arc fault exists, wherein analyzing the signature comprises (i) analyzing the signature to identify a potential arc fault, wherein the signature is based on a current of the power conversion circuit; and (ii) comparing, upon identifying the potential arc fault, the signature with a second signature for determining an arc fault signature match that identifies the arc fault, wherein the second signature is based on a voltage of the power conversion circuit; and wherein the waveform processing module further determines polarity of a DC current of the power conversion circuit; and differentiates between a series arc and a parallel arc based on the polarity.

10. The apparatus of claim 9, wherein the waveform processing module inhibits power production by the power conversion circuit upon determining that the arc fault exists.

11. The apparatus of claim 9, further comprising a shorting mechanism for applying a short circuit across DC input terminals of the power conversion circuit upon the parallel arc being identified.

12. The apparatus of claim 11, wherein the waveform processing module further analyzes the signature for current fluctuations, wherein a non-fluctuating current confirms the parallel arc.

13. The apparatus of claim 12, wherein the short circuit is removed upon determining a fluctuating current.

14. The apparatus of claim 9, wherein the series arc is identified when the polarity is positive and the parallel arc is identified when the polarity is negative.

15. The apparatus of claim 9, wherein the signature is a DC current signature based on a DC current of the power conversion circuit and the second signature is a DC voltage signature based on a DC voltage of the power conversion circuit.

16. The apparatus of claim 9, wherein determining whether the arc fault exists comprises distinguishing between irradiance-generated changes in the signature and arc-generated changes in the signature.

17. A system for managing arc faults, comprising:
a photovoltaic (PV) module;
a power converter coupled to the PV module, wherein the power converter comprises a waveform processing module coupled to a power conversion circuit, for analyzing a signature of a signal of the power conversion circuit, the waveform processing module for analyzing a signature of a signal of the power converter and determining, based on analysis of the signature, whether an arc fault exists, wherein analyzing the signature comprises (i) analyzing the signature to identify a potential arc fault, wherein the signature is based on a current of the power conversion circuit; and (ii) comparing, upon identifying the potential arc fault, the signature with a second signature for determining an arc fault signature match that identifies the arc fault, wherein the second signature is based on a voltage of the power conversion circuit; and wherein the waveform processing module further determines polarity of a DC current of the power conversion circuit; and differentiates between a series arc and a parallel arc based on the polarity.

* * * * *